(No Model.)

J. S. KNOWELS.
ANIMAL TRAP.

No. 451,057. Patented Apr. 28, 1891.

Witnesses

Inventor
John S. Knowels,
By his Attorneys,

UNITED STATES PATENT OFFICE.

JOHN S. KNOWELS, OF BUFFALO, MISSOURI.

ANIMAL-TRAP.

SPECIFICATION forming part of Letters Patent No. 451,057, dated April 28, 1891.

Application filed November 10, 1890. Serial No. 370,990. (No model.)

*To all whom it may concern:*

Be it known that I, JOHN S. KNOWELS, a citizen of the United States, residing at Buffalo, in the county of Dallas and State of Missouri, have invented a new and useful Trap, of which the following is a specification.

The invention relates to improvements in traps.

The object of the present invention is to provide a simple, inexpensive, and efficient trap which when set will not excite suspicion, and which is adapted for small animals—such as rats, rabbits, and the like—and for birds and game.

The invention consists in the construction and novel combination and arrangement of parts hereinafter fully described, illustrated in the accompanying drawings, and pointed out in the claims hereto appended.

Figure 1:
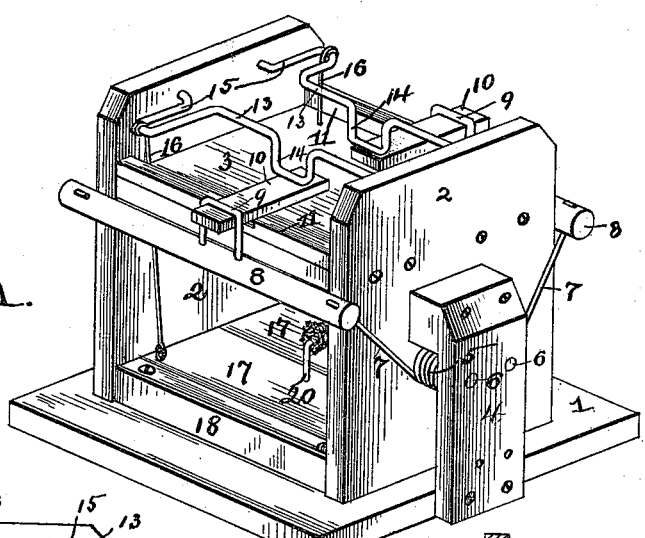
Figure 2:
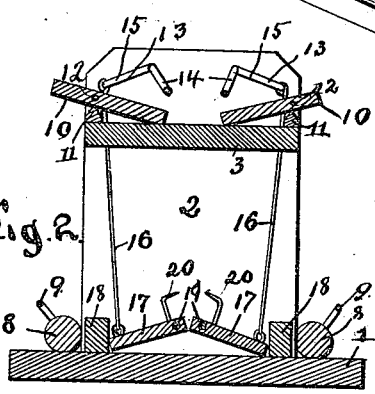
Figure 3:
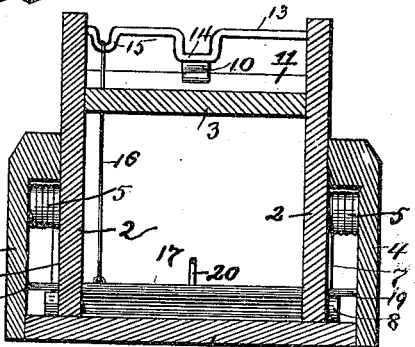
Figure 4:
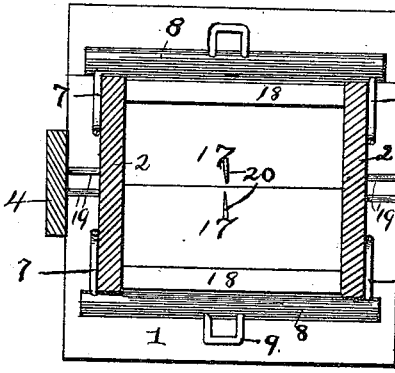

In the drawings, Figure 1 is a perspective view of a trap constructed in accordance with this invention, the trap being set. Fig. 2 is a central vertical sectional view. Fig. 3 is a similar view taken at right angles to Fig. 2. Fig. 4 is a horizontal sectional view.

Referring to the accompanying drawings, 1 designates the base, which is rectangular and constructed of wood or similar material, and having rising from it parallel sides 2, which are connected near their upper ends with a top 3. The sides 2 are arranged a short distance from the edges of the base 1 and have secured to them recessed pieces 4, which form housings for spiral springs 5, which are coiled upon cylindrical blocks 6 and have one end secured thereto and the other end 7 extended and connected to an end of a striking-bar 8, which is arranged across the opening between the sides, and is adapted to be elevated when the trap is set and to be forced downward on the neck or back of an animal by the springs when the trap is sprung. The bars are arranged at both entrances to the trap and are adapted to strike an animal entering the trap from either side. The bars are provided intermediate their ends with loops 9, which are adapted to be engaged by the outer ends of triggers 10 to hold the bars in an elevated position against the action of the springs, whereby when the trap is sprung the bars will descend with great force. The triggers 10 are pivotally mounted at points intermediate of their ends on strips 11, secured to the edges of the top 3 and extending along the same to the sides, and provided with recesses having opposite beveled shoulders 12, which form fulcrums for the triggers. The sides 2 project above the top 3 and have journaled in them equidistant of their vertical edges rock-shafts 13, which are provided intermediate of their ends with rectangular loops 14, which engage the inner ends of the trigger and hold the outer ends of the same elevated and in engagement with the loops, and the said rock-shafts are provided near one of the sides 3 with crank-loops 15, which have their outer ends connected by wires 16, which have their lower ends connected to the hinged traps 17, which form a false bottom for the trap, and when the latter is set are arranged horizontally and in the same plane with the upper faces of cross-pieces 18, secured to the base and arranged between the sides 3 at the outer edges of the same, and the said hinged traps 17 are adapted to be depressed to turn the rock-shaft and carry the rectangular setting-loops 14 out of engagement with the triggers to release the striking-bars. The traps 17 have their inner edges arranged adjacent to each other, and are beveled and are mounted on pintles 19, which are secured in the sides 3 and the recessed pieces 4. The hinged traps 17 are provided with hooks 20, to which a suitable bait is secured, and when the trap is set the hinged traps or sections which form the false bottom are perfectly level and present nothing to excite the suspicion of an animal, and the slightest touch of the hinged trap or the bait will turn the rock-shaft and release the striking-bar.

The trap is designed for small animals, and may be constructed of any size, and may also be used for game, in which case only one side of the trap is baited and the trap is placed with the baited side up, the opposite side resting on the ground.

From the foregoing description and the accompanying drawings the construction, operation, and advantages of the invention will readily be understood.

What I claim is—

1. In a trap, the combination of the frame, the striking-bars, the spiral springs secured to the sides 2 and having extended ends connected with the striking-bars, the triggers arranged to engage the striking-bars, and the rock-shafts provided with loops to engage the triggers and having crank-loops connected with the bait-hooks, substantially as described.

2. In a trap, the combination of the frame comprising the base, the sides 2, secured to the base, the top connecting the sides a short distance from their upper ends, the striking-bars, the coiled springs secured to the sides of the frame and having extended ends connected to the striking-bars, the trigger mounted on the top and arranged to engage the striking-bars, the rock-shaft journaled in the sides and provided with loops to engage the triggers and having crank-loops, and the hinged traps 17, connected with the crank-loops, substantially as described.

3. In a trap, the combination of the frame comprising the base, the vertical sides 2, rising from the base, the top connecting the sides near their upper ends, the striking-bars, the spiral springs secured to the sides and having extended ends connected to the striking-bars, the recessed pieces 4, forming housings for the springs, the hinged traps 17, provided with bait-hooks, the triggers, and the rock-shafts provided with loops to engage the triggers and having crank-loops connected with the hinged traps 17, substantially as described.

4. In a trap, the combination of the frame comprising a rectangular base, the sides rising from the base, the top connecting the sides, the cross-pieces 18, secured to the base at the edges of the sides, the trap 17, hinged between the sides and arranged when horizontal to lie flush with the upper faces 18 and form a false bottom, the striking-bars, the springs connected to the striking-bars, the triggers, and the rock-shafts arranged to engage the triggers and connected with the hinged traps 17, substantially as described.

In testimony that I claim the foregoing as my own I have hereto affixed my signature in presence of two witnesses.

JOHN S. KNOWELS.

Witnesses:
JOHN N. DAVISON,
F. W. RANDLES.